United States Patent [19]

Aoyagi et al.

[11] Patent Number: 4,609,464
[45] Date of Patent: Sep. 2, 1986

[54] HOLLOW FIBERS FOR USE IN DIALYSIS AND ARTIFICIAL KIDNEY

[75] Inventors: Juuro Aoyagi; Kazuaki Takahara, both of Tokyo; Yukio Seita, Fuji, all of Japan

[73] Assignee: Terumo Kabushiki Kaisha, Tokyo, Japan

[21] Appl. No.: 667,478

[22] PCT Filed: Feb. 17, 1984

[86] PCT No.: PCT/JP84/00050
§ 371 Date: Oct. 9, 1984
§ 102(e) Date: Oct. 9, 1984

[87] PCT Pub. No.: WO84/03228
PCT Pub. Date: Aug. 30, 1984

[30] Foreign Application Priority Data

Feb. 18, 1983 [JP] Japan .................. 58-24832

[51] Int. Cl.$^4$ ............................................. B01D 31/00
[52] U.S. Cl. ............................ 210/321.3; 210/500.1
[58] Field of Search ........................ 210/500.2, 321.3

[56] References Cited

U.S. PATENT DOCUMENTS 3,888,771  6/1975  Isuge et al. ................. 210/500.2
4,444,716  4/1984  Aoyagi et al. .

FOREIGN PATENT DOCUMENTS 134920  12/1974  Japan .
13424   2/1975  Japan .
59518   5/1975  Japan .
131029  10/1979  Japan .
151616  11/1979  Japan .
116813  9/1980  Japan .
9417    1/1981  Japan .

*Primary Examiner*—Frank Sever
*Attorney, Agent, or Firm*—Frishauf, Holtz, Goodman & Woodward

[57] ABSTRACT

A dialytic hollow fiber having an improved dialytic effect is disclosed which is characterized by having a wall thickness of 5 to 35 μm and a truly circular cross section 50 to 500 μm in outside diameter throughout the entire length and the entire circumference thereof, having a skin layer of not more than 300 Å in thickness in the outer surface thereof, and containing substantially no voids in the inner surface thereof. This dialytic hollow fiber shows a permeation ratio of 20 to 40% to cytochrome C having an average molecular weight of 12,400 and a maximum fractional molecular weight of about 40,000 at an inhibition ratio of 95%, and an artificial kidney using said dialytic hollow fiber.

22 Claims, 8 Drawing Figures

HOLLOW FIBERS FOR USE IN DIALYSIS AND ARTIFICIAL KIDNEY

DESCRIPTION

1. Technical Field

This invention relates to a hollow fiber for use in dialysis and an artificial kidney utilizing the hollow fiber. More particularly, this invention relates to a dialytic hollow fiber to be used such as in an artificial kidney system having an excellent dialytic effect.

2. Background of Art

Recently, artificial kidney systems harnessing the action of dialysis, the action of ultrafiltration, etc. have been showing remarkable growth and finding extensive utility in the medical world. In these artificial kidney systems, dialytic hollow fibers of extremely small diameters constitute themselves the most important member.

The dialytic hollow fibers are typified by (1) a drawn and oriented hollow fiber perforated throughout the entire length thereof and having a uniform wall thickness of several $\mu$m to 60 $\mu$m and a uniform truly circular cross section 10 $\mu$m to several hundred $\mu$m in outside diameter through the entire length and the entire circumference thereof (Japanese Patent Publication No. SHO 50(1975)-40,168), (2) a hollow artificial fiber formed of cuprammonium regenerated cellulose and having a cross-sectional construction wherein the constituent near the outer surface is denser than the constituent near the inner surface and the constituent in the intermediate part (Japanese Patent Publication No. SHO 55(1980)-1,363), and (3) a dialytic hollow fiber of cuprammonium regenerated cellulose so constructed that the cuprammonium regenerated cellulose tube containing a hollow core, when observed in a wetted state under an electron microscope, shows a substantially homogeneous and microporous texture containing fine interstices not more than 200 Å in size throughout lateral and longitudinal cross sections (Japanese Laid-Open No. SHO 49(1974)-134,920). These hollow fibers are invariably manufactured by extruding cuprammonium cellulose spinning dope through an annular spinning orifice into the ambient air, allowing the extruded tube of spinning dope to fall down by its own weight and, on that occasion, discharging into the central portion of the linearly extruded spinning dope a liquid noncoagulable relative to the spinning dope thereby filling the hollow core of the tube of spinning dope with that liquid, then allowing the extruded tube of spinning dope to be thoroughly drawn by the fall under its own weight and submerging the drawn tube of spinning 'dope under a dilute surfuric acid solution thereby coagulating and regenerating the spinning dope.

Production of a dialytic system such as an artificial kidney system by the use of such hollow fibers is effected, for example, by inserting a bundle of hollow fibers of the aforementioned description in a tubular body provided near the opposite extremities thereof with an inlet tube and an outlet tube and subsequently sealing the opposite ends of the bundle of hollow fibers in conjunction with the opposite extremities of the aforementioned tubular body with resin such as polyurethane. Thus, the dialytic system is completed in a construction resembling the construction of a shell-and-tube type heat exchanger, for example.

These hollow fibers are invariably manufactured by extruding the cuprammonium cellulose spinning dope into a gaseous atmosphere, allowing the extruded tube of spinning dope to fall under its own weight, and thereafter submerging the tube under a coagulating solution thereby coagulating and regenerating the spinning dope. While the extruded tube of spinning dope is falling down in the gaseous atmosphere, therefore, ammonia separates to some extent from the cellulose and begins to set inside the wall of the extruded wall inwardly from the outer surface. The hollow fibers thus produced, therefore, form a skin in the outer surface, though to a varying degree depending on the method of manufacture to be employed. Thus, none of these conventional hollow fibers has a homogeneous texture in the inner and outer surface portions and in the intermediate portion. The hollow fibers manufactured by the method of (1) described above, for example, when photographed through an electron microscope, are found to have entailed formation of voids about 1,300 Å in size. Although the exact cause for the formation of such voids has not yet been clarified, a plausible explanation may be that the aforementioned skin formed in the tube of spinning dope during the descent of this tube throuth the gaseous atmosphere prevents the separated ammonia from being uniformly dispersed and compels it to undergo one sort of effervescence and give rise to voids.

When an artificial kidney system which is produced with hollow fibers having a thin skin in the outer surface and containing voids in the inner surface as described above is operated for the dialysis of blood, the blood under treatment tends to induce thrombosis and the shaped components of blood such as blood corpuscles are liable to be impaired by the aforementioned voids. Consequently, the dialytic effect produced by the system is far from being sufficient and the separation of components of medium molecular weights and the water removal effeciency are not sufficient. For example, the aforementioned hollow fibers have not satisfactry dialytic effect. To offer a satisfactory dialytic effect, they are required to be produced in a smaller wall thickness. A decrease in the wall thickness inevitably results in a decrease of the already insufficient mechanical strength. In the case of hollow fibers which have been excessively drawn during the course of their manufacture, these hollow fibers have not satisfactory dialystic effect and possess not satisfactory removal effeciency for water. When the aforementioned artificial kidney system using these hollow fibers is sterilized by the use of an autoclave, for example, the hollow fibers fixed with a potting agent at the opposite extremities of the tubular body are shrunken by heat and consequently drawn taut. This phenomenon can be one cause for the channelling of the dialytic solution. In an extreme case, the set mass of the aforementioned potting agent may be bent increasingly more toward the center of the tube body possibly to induce the phenomenon of blood stagnation.

An object of this invention, therefore, is to provide a novel dialytic hollow fiber. Another object of this invention is to provide an artificial kidney system having an excellent dialytic effect.

DISCLOSURE OF INVENTION

These objects are attained by a dialytic hollow fiber of cuprammonium cellulose having a continuously perforated hollow core throughout the entire length thereof, which hollow fiber is characterized by having a wall thickness of 5 to 35 $\mu$m and a truly circular cross section 50 to 500 μm in outside diameter throughout the entire length and the entire circumference thereof, having a skin layer not more than 300 Å in thickness in the outer surface and having substantially no voids in the inner surface.

This invention embraces a dialytic hollow fiber having tensile strength in the range of 10 to 30 kg/mm² (in dry state: In order to be observed by electron microscope process moisture rate of the fiber is adjusted to 11% by leaving the fiber in a room under condition of 20° C. of temperature and 65% of relative humidity for 8 to 24 hours.). It further embraces a dialytic hollow fiber having an elongation in the range of +1.0 to −5.0% under the conditions of 121° C. of temperature and 100% of relative humidity. It also embraces a dialytic hollow fiber having a maximum fractional molecular weight of about 40,000 at an inhibition ratio of 95%.

This invention embraces a dialytic hollow fiber having a wall thickness of 10 to 20 μm and outside diameter of 100 to 300 μm and having a skin layer of not more than 200 Å in thickness. This invention embraces a dialytic hollow fiber having the tensile strength of 15 to 25 kg/mm² in dry state. This invention further embraces a dialystic hollow fiber wherein the elongation of said hollow fiber at 121° C. of temperature and 100% of relative humidity falls in the range of 0 to −3.0%. This invention also embraces a dialystic hollow fiber wherein the knot strength of said hollow fiber falls in the range of 10 to 30 kg/mm² in dry state.

This invention also embraces a dialystic hollow fiber of cuprammonium cellulose having a contiuously perforated hollow core throughout the entire length thereof, which hollow fiber is characterized by having a wall thickness of 5 to 35 μm and truly circular cross section 50 to 500 μm in out side diameter throughout the entire length and the entire circumference thereof, having a permeation ratio in the range of 20 to 40% for cytochrome C with an average molecular weight of 12,400, and having a maximum fractional molecular weight of about 40,000 at inhibition ratio of 95%.

This invention also embraces a dialytic hollow fiber wherein the inner surface has substantially no void. This invention also embrance a dialytic holllw fiber wherein the tensile strength of said hollow fiber is in the range of 10 to 30 kg/mm² in dry state. This invention also embrances a dialytic hollow fiber wherein the elongation of said hollow fiber at 121° C. of temperature and 100 of relative humidity falls in the range of +1.0 to −5.0%. This invention also embraces a dialytic hollow fiber wherein the permeation ration for Cytochrome C having an average molecular weight of 12,400 is about 30%.

This invention embraces a dialytic hollow fiber of cuprammonium cellulose having a continuously perforated hollow core throughout the entire length thereof, which hollow fiber is characterized by having a wall thicikness of 5 to 25 μm and a truly circular cross section 50 to 500 μm in outside diameter throughout the entire length and the entire circumference thereof, having a ultra filtration rate (UFR) of over 4.2 (ml/mmHg·Hr·m²), and having a maximum fractional molecular weight of about 40,000 at an inhibition rate of 95%.

This invention also embraces a dialytic hollow fiber wherein the inner surface has substantially no void. This invention also embraces a dialytic hollow fiber wherein the tensile strength of said hollow fiber is in the range of 10 to 30 kg/mm² in dry state. This invention also embraces a dialytic hollow fiber wherein the elongation of said hollow fiber at 121° C. of temperature and 100% of relative humidity falls in the range of +1.0 to −5.0%.

This invention embraces an artificial kidney wherein a bundle of many dialytic hollow fibers of cuprammonium cellulose having a continuously perforated hollow core throughout the entire length thereof, which hollow fiber is characterized by having a wall thickness of 5 to 35 μm and a truly circular cross section 50 to 500 μm in outside diameter throughout the entire length and the entire circumference thereof, having a skin layer of not more than 300 Å in thickness in the outer surface thereof, and containing substantially no voids in the inner surface thereof is inserted into a housing having a blood inlet port and a blood outlet port, and the both ends of the bundle are fixed to the housing by a potting agent so as to communicate with the blood inlet and outlet ports respectively.

This invention also embraces an artificial kidney, wherein the tensile strength of said hollow fiber is in the range of 10 to 30 kg/mm² in dry state. This invention also embraces an artificial kidney wherein the elongation of said hollow fiber at 121° C. of temperature and 100% of relative humidity falls in the range of +1.0 to −5.0%. This invention also embraces an artificial kidney wherein the maximum fractional molecular weight of said hollow fiber at an inhibition ratio of 95% is about 40,000. This invention also embraces an artificial kidney wherein said wall thickness is in the range of 10 to 20 μm, the outside diameter is in the range of 100 to 300 μm, and the thickness of said skin layer in the outer surface is not more than 200 Å. This invention also embraces an artificial kidney wherein said tensile strength is in the range of 15 to 25 kg/mm² in dry state. This invention also embraces an artificial kidney wherein the elongation of said hollow fiber at 121° C. of temperature and 100% of relative humidity is in the range of 0 to −3.0%. This invention also embraces an artificial kidney wherein the knot strength of said hollow fiber falls in the range of 10 to 30 kg/mm² in dry state.

This invention also embraces an artificial kidney wherein a bundle of many dialytic hollow fibers of cuprammonium cellulose having a continuously perforated hollow core throughout the entire length thereof, which hollow fiber is characterized by having a wall thickness of 5 to 35 μm and a truly circular cross section 50 to 500 μm in outside diameter throughout the entire length and the entire circumference thereof, having a permeation ratio in the range of 20 to 40% for cytochrome C with an average molecular weight of 12,400, and having a maximum fractional molecular weight of about 40,000 at an inhibition ratio of 95% is inserted into a housing having a blood inlet port and a blood outlet port, and the both ends of the bundle and the both ends of the cylindrical body are fixed by a potting agent so as to communicate with the blood inlet and outlet port respectively.

This invention also embraces an artificial kidney wherein the inner surface has substantially no voids. This invention also embraces an artificial kidney wherein the tensile strength of said hollow fiber is in the range of 10 to 30 kg/mm² in dry state. This invention also embraces an artificial kidney wherein the elongation of said hollow fiber at 121° C. of temperature and 100% of relative humidity falls in the range of +1.0 to −5.0%. This invention also embraces an artificial kidney wherein the permeation ratio for cytochrome C having an average molecular weight of 12,400 is about 30%.

This invention embraces an artificial kidney wherein a bundle of many dialytic hollow fibers of cuprammonium cellulose having a continuously perforated hollow core throughout the entire length thereof, which hollow fiber is characterized by having a wall thickness of 5 to 25 μm and a truly circular cross section 50 to 500 μm in outside diameter throughout the entire length and the entire circumference thereof, having a ultra filtration rate (UFR) of over 4.2 (ml/mmHg·hr·m$^2$), and having a maximum fractional molecular weight of about 40,000 at an inhibitation ratio of 95% is inserted into a housing having a blood inlet port and a blood outlet port, and the both ends of the bundle are fixed to the housing by a potting agent so as to communicate with the blood inlet and outlet ports respectively.

This invention also embraces an artificial kidney wherein the inner surface has substantially no void. This invention also embraces an artificial kidney wherein the tensile strength of said hollow fiber is in the range of 10 to 30 kg/mm$^2$ in dry state. This invention also embraces an artificial kidney wherein the elongation of said hollow fiber at 121° C. of temperature and 100% of relative humidity falls in the range of +1.0 to −5.0%.

The housing may be any shape such as circular cylinder, polyangle cylinder, oval cylinder, etc., and it is not limited. The ports may be used as the blood ports or a dialysis solution ports by varying the flow direction.

BEST MODE OF CARRYING OUT THE INVENTION

Figure 1:
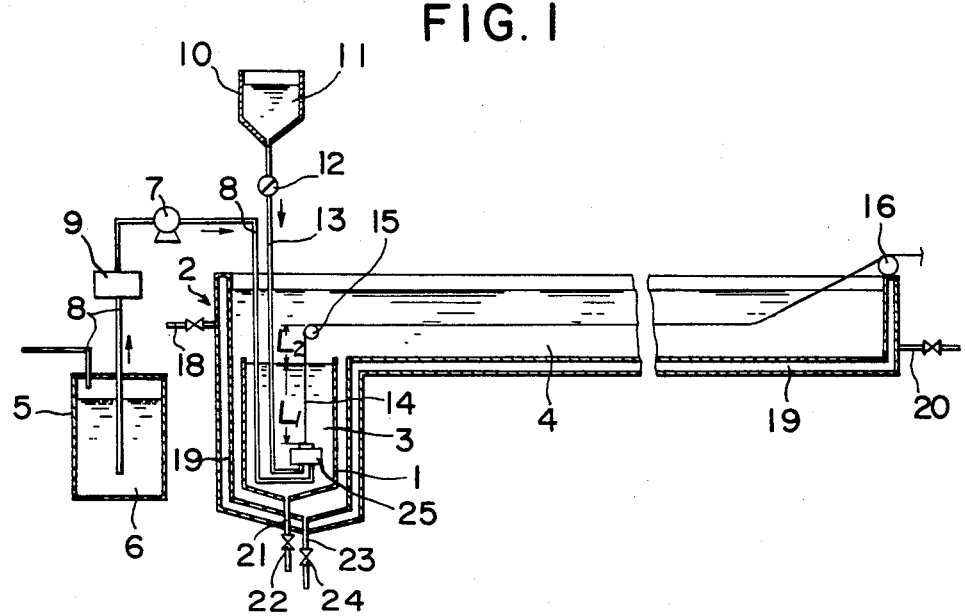
FIG. 1 is a schematic longitudinal cross section illustrating a typical device for the manufacture of a hollow fiber in accordance with the present invention.

The hollow fiber of this invention is a dialytic hollow fiber of cuprammonium cellulose having a continuously perforated hollow core throughout the entire length thereof and chracterized by having a wall thickness of 5 to 35 μm, preferably 10 to 20 μm and a truly circular cross section 50 to 500 μm, preferably 100 to 300 μm, in outside diameter throughout the entire length and the entire circumference thereof, having a skin layer not more than 300 Å, preferably not more than 200 Å, and more preferably substantially no skin layer as observed under an electron microscope at 20,000 magnifications, in the outer surface, and having substantially no voids in the inner surface.

The hollow fiber described above is such that when the longitudinal cross section thereof is observed under an electron microscope, it is found to have a skin layer of not more than 300 Å, preferably not more than 200 Å, on dry basis, namely to have substantially no skin. Similarly by the observation under the electron microscope, the hollow fiber of this invention is found to have substantially no void in the inner surface (the surface which may be brought into contact with the blood), whereas the conventional countertype is found to contain about 5 to 50 voids about 200 to 700 Å in diameter in the unit area of 1 μm$^2$ of the inner surface on dry basis.

The "skin layer" is generally called a layer at the surface having a thickness wherein fine structure varies slightly from the surface to the inner part in the section of the fiber and which can be recognized by a microscope. The skin layer has difference from the inner part in properties, so it is a part wherein the molecular disportion is good. The inner part is called "core". The words "void" and "voids" herein means vacant pores contained in the high molecular materials which are of a size recognized by microscope or the naked eye. They are usually recesses.

The tensile strength of the hollow fiber described above is 10 to 30 kg/mm$^2$, preferably 15 to 25 kg/mm$^2$ in dry state and 0.5 to 5.0 kg/mm$^2$, preferably 1.0 to 3.0 kg/mm$^2$ in wet state. The elongation of this hollow fiber, after sterilization by an autoclave (121° C. of temperature, 100% of relative humidity, and 20 minutes of duration), is +1.0 to −5.0%, preferably 0 to −3.0%. The maximum fractional molecular weight of the hollow fiber at an inhibition ratio of 95% is about 40,000. The knot strength of the hollow fiber is 10 to 30 kg/mm$^2$, preferably 15 to 25 kg/mm$^2$ in dry state and 0.5 to 5.0 kg/mm$^2$, preferably 1.0 to 3.0 kg/mm$^2$ in wet state. The permeation ratio of cytochrome C having an average molecular weight of 12,400 is 20 to 40% preferably about 30%.

Now, the method by which the hollow fiber contemplated by the present invention is manufactured will be described below with reference to the accompanying drawings. A bath 2 is provided in the bottom part thereof with an noncoagulant liquid vessel 1 as illustrated in FIG. 1, a liquid 3 formed of a halogenated hydrocarbon and noncoagulable relative to the aforementioned cellulose type spinning dope is supplied as a lower layer to the aforementioned noncoagulant liquid vessel 1 and a liquid 4 having a lower specific gravity than the aforementioned noncoagulant liquid and coagulable relative to the aforementioned cellulose type spinning dope is supplied as an upper layer to the bath 2, so as to form a bath liquid of two layers.

A cellulose type spinning dope 6 in the spinning dope storage tank 5 is forcibly delivered by a pump (such as, for example, a gear pump) 7 via a conduit 8 to a filter 9, there to be filtered. The filtered spinning dope is directly extruded into the aforementioned lower layer of noncoagulant liquid 3 through an annular spinning orifice (not shown) formed as upwardly directed in a spinneret means 25. In this while, noncoagulant liquid 11 relative to the spinning dope which is stored in an inner liquid storage tank 10 is fed as an inner liquid by virtue of spontaneous head to a flow meter 12, forwarded via a conduit 13 to the aforementioned spinneret means 25, and led to into the central part of the interior of an annular spinning dope 14 extruded through the aforementioned annular spinning orifice. The linear spinning dope 14 extruded through the annular spinning orifice in a state containing the noncoagulant liquid 11 therein is advanced upwardly through the lower layer of noncoagulant liquid 3 while in a state not coagulated at all. In this case, the linear spinning dope 14 is pressurized by the non-coagulant liquid 3 and the coagulant liquid 4, so it is raised under the influence of the buoyancy generated by the difference of specific gravity between the spinning dope and the noncoagulant liquid. Then, the linear spinning dope 14 begins to ascend through the upper layer of coagulant liquid 4 unert becoming slender. By means of a direction changing bar 15 disposed in the coagulant liquid 4, the ascending linear spinning dope 14 has the course of its advance changed so as to be passed amply through the aforementioned coagulant liquid 4. On completion of the passage through this coagulant liquid 4, this linear spinning dope is drawn out of the coagulant liquid by a roll 16 and forwarded to the next step.

In this case, a constant temperature circulation liquid 19 is fed through an inlet 18 into the aforementioned bath 2 and discharged via an outlet 20, enabling the coagulant liquid 4 to be retained at a stated temperature such as, for example, a temperature of 20 ±2° C. After service or during replacement with a fresh supply, the noncoagulant liquid 3 is released through an outlet 21 and discharged via a valve 22. At the same time, the coagulant liquid 4, after service or during replacement with a fresh supply, is released through an outlet 23 and discharged via a valve 24.

The cellulose type spinning dope to be used for the manufacture of the hollow fiber of this invention is a metallic ammonia cellulose such as cuprammonium cellulose. Although various types of celluloses are usable, those having average polymerization degrees of 500 to 2500 for example, are used particularly desirable. A cuprammonium cellulose solution is prepared by conventional methods. For example, first, an aqueous ammonium copper solution is prepared by mixing aqua ammonia, an aqueous basic copper sulfate solution and water. This aqueous ammonium copper solution is mixed with an antioxidant (such as, for example, sodium sulfite) and then with cellulose, as the basic material, and the resultant mixture is stirred to ensure solution. Then, the mixture is combined with an aqueous sodium hydroxide solution to bring about thorough solution of persistent cellulose and afford a cuprammonium cellulose solution. Optionally, this cuprammonium cellulose solution may incorporate therein a permeability regulator and keep it in coordinate linkage.

The spinning dope thus prepared generally has a specific gravity in the range of 1.05 to 1.15, preferably 1.06 to 1.10. As described more specifically afterward, the linear spinning dope extruded through the spinning orifice is filled in the interior thereof with the noncoagulant liquid. The overall specific gravity of the spinning dope, therefore, generally has a lower specific gravity as in the range of 1.00 to 1.08, preferably 1.01 to 1.04.

The noncoagulant liquid which is not coagulable relative to the cellulose type spinning dope and which is used as the lower layer is a halogenated hydrocarbon which has a specific gravity greater than the bulk density of the aforementioned linear spinning dope (the tube of spinning dope containing the noncoaguant liquid therein as the inner liquid) and the specific gravity of the coagulant liquid, exhibits low solubility in water, and possesses small surface tension. Specifically, the specific gravity of the noncoagulant liquid used as the lower layer is generally at least 1.3, preferably in the range of 1.4 to 1.7. Examples of the halogenated hydrocarbon usable as the noncoagulant liquid incluse carbon tetrachloride ($d_4^{20} = 1.632$, solubility in water 0.08 g/20° C.-100 ml, and surface tension (at 25° C.) 26.8 dynes/cm), 1,1,1-trichloroethane ($d_4^{20} = 1.349$), 1,1,2-trichloroethane ($d_4^{20} = 1.442$), trichloroethylene ($d_4^{20} = 1.440$, solubility in water 0.11 g/25 C.-100 ml, and surface tension (at 25° C.) 31.6 dynes/cm), tetrachloroethane ($d_4^{22} = 1.542$), tetrachloroethylene ($d^0 = 1.656$, insoluble in water) and trichlorotrifluoroethane ($d^{25} = 1.565$, solubility in water 0.009 g/21° C.-100 ml, and surface tension (at 25° C.) 19.0 dynes/cm). Particularly, the spinnability of the hollow fiber is extremely high when the noncoagulant liquid to be selected from the group of the halogenated hydrocarbons enumerated above has solubility in water of not more than 0.05 g/21° C.-100 ml and surface tension (at 25° C.) of not more than 20 dynes/cm. Specifically, the noncoagulant liquids satisfying this requirement are tetrachloroethylene and trichlorotrifluoroethane, for example. The height of the noncoagulant liquid layer (the distance $L_1$ indicated in the diagram of FIG. 1) falls generally in the range of 50 to 250 mm, preferably in the range of 100 to 200 mm, although it is variable with the spinning speed.

The particular type of the noncoagulant liquid (inner liquid) to be used for filling the interior of the linear spinning dope heavily affects the retainability of the hollow core of the hollow fiber and the smoothness of the wall surface of the hollow fiber. If the noncoagulant liquid filling the hollow core abruptly passes through the wall of the hollow fiber and disperses into the ambient air while the hollow fiber is being dried, the hollow core of the fiber is deprived of pressure to entail complete destuction of the hollow core itself or serious impairment of the smoothness of the inner wall surface of the fiber. To preclude this trouble, therefore, the noncoagulant liquid is selected from among the liquids which have low specific gravity and show low permeability coefficient while the hollow fiber is being dried. Since the specific gravity of the cellulose type spinning dope generally falls in the range of 1.05 to 1.15 as represented by that of the cuprammonium cellulose spinning dope which is about 1.08, the specific gravity of the aforementioned noncoagulant liquid ought to be selected in a range such that the bulk density of the linear spinning dope incorporating therein the noncoagulant liquid will fall in the range of 1.00 to 1.08, preferably in the range of 1.01 to 1.04, for example, near 1.02. Thus, the specific gravity of this noncoagulant liquid falls generally in the range of 0.65 to 1.00, preferably in the range of 0.70 to 0.90, for example, near 0.85. Examples of the noncoagulant liquid which meets this requirement include are n-hexane, n-heptane, n-octane, n-decane, n-dodecane, liquid paraffin, isopropyl myristate, light oil, kerosene, benzene, toluene, xylene, styrene and ethylbenzene.

The coagulant liquid relative to the cellulose type spinning dope has a lower specific gravity than the noncoagulant liquid of the lower layer. It is an aqueous alkali solution having a specific gravity generally in the range of 1.03 to 1.10. Examples of the alkali of this aqueous solution are sodium hydroxide, potassium hydroxide, lithium hydroxide and ammonium hydroxide.

Sodium hydroxide proves particularly desirable among other alkalis. The concentration of the alkali in the aqueous solution, computed as sodium hydroxide, falls in the range of 30 to 150 g-NaOH/liter, desirably in the range of 35 to 80 g-NaOH/liter, most desirably in the range of 40 to 60 g-NaOH/liter, and especially near 50 g-NaOH/liter (about 4.8% by weight, d=1.055). Then, the distance from the interface between the coagulant liquid and the aforementioned noncoagulant liquid to the end of the direction changing bar (the distance $L_2$ indicated in the diagram of FIG. 1) falls generally in the range of 5 to 30 mm, preferably in the range of 10 to 20 mm.

When the manufacture of the present invention is carried out by the method described above, the hollow fiber can be obtained at a spinning speed of at least 30 m/min and particularly at a spinning speed of at least 38 m/min, or even at least about 55 m/min, when the noncoagulant liquid to be used has solubility in water of not more than 0.05 g/21° C.-100 liter and surface tension of not more than 20 dynes/cm.

The hollow fiber which has been coagulated and regenerated as described above is washed with water to be freed from the coagulant liquid still adhering to the surface, optionally subjected subsequently to a treatment adapted to remove copper or other metal remaining within the hollow fiber, and finally rinsed with water. This treatment for the removal of residual metal is generally carried out by immersing the hollow fiber in a dilute solution containing sulfuric acid or nitric acid in a concentration of 3 to 30%. When the spinning dope has contained the aforementioned permeability regulator, the produced hollow fiber is deprived of the regulator while it is passing the aforementioned alkaline coagulant liquid. Owing to the removal of the regulator, extremely fine pores corresponding to the particular molecular weight of the polymer used as the regulator are formed in the wall of the hollow fiber.

The hollow fiber which has undergone the final rinsing with water or the treatment for the removal of the permeability regulator is optionally treated with hot water at 35° to 100° C., preferably 50° to 80° C. or plasticized by the use of an aqueous solution containing glycerin in a concentration of 1 to 10% by weight, preferably 2 to 5% by weight, and then freed from still remaining copper or medium to low molecular weight cellulose. It is then dried and taken up on a reel, to afford a desired hollow fiber.

Now, the present invention will be described more specifically below with reference to working examples. Whenever percents are mentioned in the following examples, they are meant percents by weight unless otherwise specified.

EXAMPLE 1

An aqueous ammonium copper solution was prepared by suspending 540 g of basic copper sulfate in 2,354 g of an aqueous 25% ammonia solution and 1,690 g of an aqueous 10% sodium sulfite solution was added to the former aqueous solution. In the resultant mixed solution, 2,273 g of wetted linters (having a water content of 69.7%) obtained by wet grinding cotton linter pulp having a polymerization degree of about 1,000 (±100) and subsequently dehydrating the ground pulp and 210 g of RO water for concentration adjustment were stirred for thorough solution. Then, the resultant mixture was combined with 1,233 g of aqueous 10% sodium hydroxide solution to prepare an aqueous cuprammonium cellulose solution (specific gravity 1.0 g) to be used as a spinning dope.

Separately, in an apparatus constructed as shown in FIG. 1, 1,1,1-trichloroethane was fed as an noncoagulant liquid 3 to the noncoagulant liquid vessel 1 of the bath 2 to form a lower layer. Then an aqueous sodium hydroxide solution of a concentration of 50 g/liter was fed as a coagulant liquid to the bath 2 to form an upper layer. The aforementioned spinning dope 6 was forwarded from the dope storage tank 5 throught the filter 9 to the spinneret means 25 having the annular spinning orifice mounted as directed upwardly therein. The spinning dope was directly extruded throuth the spinning orifice with nitrogen pressure into the noncoagulant liquid 3 kept at a temperature of 20 ±2° C. The spinning orifice had a diameter of 3.8 mm and the spinning dope (cell. 7.8%, 1.100 p (20° C.)) was extruded at a rate of 5.86 ml/min. Through the inlet tube 13 for the noncoagulant liquid disposed in the spinneret means 25, isopropyl myristate (specific gravity 0.854) was introduced and discharged by incorporating into the interior of the aforementioned extruded spinning dope. THe vapor inlet tube had a diameter of 1.2 mm and isopropyl myristate was discharged at a rate of 1.50 ml/min. Subsequently, the extruded spinning dope (incorporating the noncoagulant liquid therein) 14 (specific gravity 1.026) was allowed to rise through 1,1,1-trichlorotrifluoroethane and futher through the upper layer of aqueous sodium hydroxide solution (20 ±2° C.) and thereafter passed over the direction changing bar 15 so as to be advance thence in a horizontal direction. In this case, the height $L_1$ of the layer of the noncoagulant liquid was 200 mm and the distance $L_2$ from the interface between the two liquid layers to the upper end of the direction changing bar 15 was 150 mm, the spinning speed was 60 m/min, the traverse wind was 80, and the distance of travel was 4.4 m. The linear spinning dope was pulled out of the bath, then held in contact with an aqueous 12% sodium hydroxide solution for a fairly long period to be amply coagulated, then washed with water, subjected to regeneration with 5% sulfuric acid, again washed with water, and thereafter dried at 100° to 140° C. The whole process described above was carried out continuously while avoiding exerting tension to bear upon the fine tube of spinning dope passed through the successive steps of treatment mentioned above, except for the tension necessary for advantting the tube of spinning dope.

Figure 2:
FIG. 2 is a photograph of the texture in the longitudinal cross section of a hollow fiber of the present invention, taken through an electron microscope.
Figure 3:
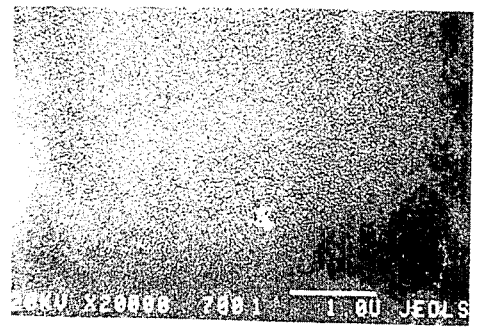
FIG. 3 is a photograph of the texture in the inner surface of the hollow fiber of the present invention, taken through an electron microscope.

The hollow fiber thus obtained had a wall thickness of about 12.5 $\mu$m and an outside diameter of about 225 $\mu$m. A longitudinal cross section of this hollow fiber was photographed at 20,000 magnifications through a scanning electron microscope (JSM7 35FC) made by Nippon Densi Kabushiki Kaisha. This photograph is shown in FIG. 2. From this photograph, it is noted that the outer surface of the hollow fiber had substantially no skin. The inner surface of this hollow fiber was photographed at 20,000 magnifications through the aforementioned scanning electyron microscope. This photograph is shown in FIG. 3. From this photograph, it is noted that the inner surface of this hollow fiber was substantially destitute of voids. The tensile strength of this hollow fiber, when tested by the method of JIS L-1070, was 16 kg/mm$^2$ in dry state and 1.9 kg/mm$^2$ in wet state. The knot strength was found to be 16 kg/mm$^2$ in dry state and 1.9 kg/mm$^2$ in wet state. After the hollow fiber was sterilized in an autoclave (at 121° C. of temperature, 100% of relative humidity, for 20 minutes), it showed an elongation of −0.4%. The draft ratio was 81%.

EXAMPLE 2

The procedure of Example 1 was followed, except that 1,1,1-trichloroethane was used as an noncoagulant liquid 3, an aqueous solution containing sodium hydroxide in a concentration of 46 g/liter was used as a coagulant liquid, the spinning dope (cell 8.7%, 2,670 p (20° C.)) was extruded at a rate of 6.47 ml/min, and isopropyl myristate (specific gravity 0.854) was introduced and injected at a rate of 2.64 ml/min to be included in the aforementioned linear spinning dope. A hollow fiber was obtained at a spinning speed of −80 m/min.

The hollow fiber thus obtained had a wall thickness of about 13.5 μm and an outside diameter of about 250 μm. When the outer surface of the hollow fiber was photographed through the scanning electron microscope, it was found to have substantially no skin. Similarly, the inner surface of the hollow fiber contained no voids. The tensile strength of this hollow fiber, when tested by the method of JIS L-1070, was found to be 19 kg/mm$^2$ in dry state and 2.5 kg/mm$^2$ in wet state. The knot strength was found to be 19 kg/mm$^2$ in dry state and 2.5 kg/mm$^2$ in wet state. After the hollow fiber was sterilized in an autoclave (at 121° C. of temperature, 100% of relative humidity, 20 minutes), the elongation was found to be −0.8%. The draft ratio was 98.

CONTROL 1

Figure 4:
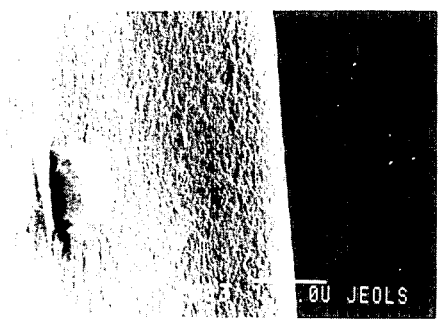
FIG. 4 is a photograph of the texture in the longitudinal cross section of a conventional hollow fiber, taken through an electron microscope.
Figure 5:
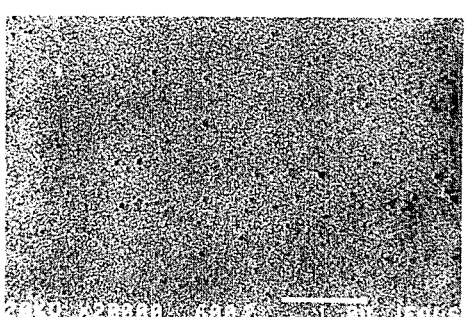
FIG. 5 is a photograph of the texture in the inner surface of the conventional hollow fiber, taken through an electron microscope.

A commercially available hollow fiber (ENKA Granzatoff AG (West Germany), marketed under trademark designation of Cl), when tested similarly to Example 1, was found to have a wall thickness of 11 μm, an outside diameter of 200 μm, and an available membrane area of 1.0 m$^2$. The longitudinal cross section of this hollow fiber was photographed similarly through the scanning electron microscope. The photograph is shown in FIG. 4. From this photograph, the hollow fiber is noted to have a skin about 420 Å in thickness. The photograph similarly taken of the inner surface is shown in FIG. 5. From this photograph, the hollow fiber is noted to contain about six voids of about 320 to 580 Å per μm$^2$. The tensile strength was found to be 25.2 kg/mm$^2$ in dry state and 3.7 kg/mm$^2$ in wet state. The knot strength was found to be 27.4 kg/mm$^2$ in dry state and 4.1 kg/mm$^2$ in wet state. After this hollow fiber was sterilized in an autoclave (at 121° C. of temperature, 100% of relative humidity, 20 minutes), it was found to have an elongation of −1.0%.

CONTROL 2

Figure 6:
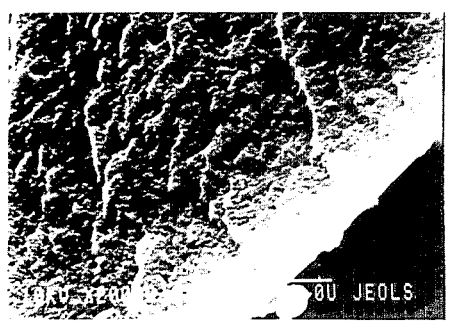
FIG. 6 is a photograph of the texture in the longitudinal cross section of another conventional hollow fiber, taken through an electron microscope.
Figure 7:
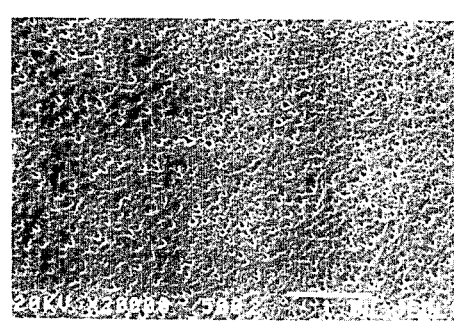
FIG. 7 is a photograph of the texture in the inner surface of the aforementioned another conventional hollow fiber, taken through an electron microscope.

The hollow fiber used in a commercially avaiable artificial kidney system (made by Asahi Medical Co., and marketed under trademark designation of AM-10 (H)) tested similarly to Example 1. Consequently, the hollow fiber was found to have a wall thickness of 15 μm, an outside diameter of 200 μm, and an available membrane area of 1.1 m$^2$. The longitudinal cross section of this hollow fiber was photographed similarly through the scanning electron microscope. The photograph is shown in FIG. 6. From the photograph, the hollow fiber is noted to have a skin about 1,300 Å in thickness. The inner surface of the hollow fiber was similarly photographed by the scanning electron microscope. The photograph is shown in FIG. 7. From this photograph, the inner surface is noted to contain about 40 voids of about 200 to 700 Å per μm$^2$. The tensile strength was 13.9 kg/mm$^2$ in dry state and 3.3 kg/mm$^2$ in wet state. The knot strength was 13.9 kg/mm$^2$ in dry state and 3.2 kg/mm$^2$ in wet state. After the hollow fiber was sterilized in an autoclave (at 121° C. of temperature, 100% of relative humidity, for 20 minutes), it showed an elongation of −0.5%.

EXAMPLE 3

A bundle of 7,600 hollow fibers obtained by the procedure of Example 1 and similar bundles each of as many hollow fibers (about 165 mm) available in the market were each stowed in a tubular body of polycarbonate resin, with the opposite terminals of the bundle and the tubular body sealed with a potting agent made of polymer, to complete artificial kidney systems. In other words, these were artificial kidney systems produced by using hollow fibers produced by the procedure of Example 1 and Controls 1–2. Besides, commercially avaiable artificial kidney systems (AM-10 (L) and AM-80) produced by using hollow fibers were cited herein as Controls 3–4. Thus, a total of five kidney systems were prepared. These artificial kidney systems were sterilized with ethylene oxide and then tested for inhibition ratios and permeability coefficients of varying solutes.

First, various index substances were separately dissolved in physiological saline water and tested in a simple component as indicated in Table 1.

TABLE 1

| Index substance | Concentration in solution (mg/dl) | Method of determination |
| --- | --- | --- |
| Creatinine | 60 | Jaffe method |
| Vitamin B$_{12}$ | 60 | Direct absorption method (360 nm) |
| Inulin | 60 | Thiobarbitul method |
| Bovine albumin | 300* | BCG method |

*Since the permiability was so low that the concentration had to be heightened to improve the reliability of quantitative determination.

The circulation test was performed at room temperature (23.5±2° C.) under the conditions of 200 ml/min of flow speed and TMP 200 mmHg (Note 1). The determination of the fractional molecular weight was conducted by sampling 4 ml of the filtrate of normal conditions (Note 2) at two or more points (at intervals of 30 minutes), averaging the found values, and reporting the average. The determination of the amount of permeation was effected by collecting the filtrate under normal conditions in a measuring cylinder and finding the volume of the collected filtrate against the scale on the measuring cylinder. The filtrate was returned to the solution vessel before the solute concentration in the circulating liquid increased.

(Note 1) $(P_i+P_o)/2=200$ mmHg
(Note 2) In a preparatory time-course sampling, the time at which the first found value reached a constant level was taken as the starting point for the normal condition.

The permeability coefficients of various solutes were based on the following definition and the results were as shown in Table 2. The inhibition ratios thereof were based on the following definition and the results were as shown in Table 3.

Permeability $(T)=(Cf/Ci)\times 100$ (%)
Permeability coefficient $(Tr)=Cf/Ci$
Inhibition ratio $(R)=(Cf-Cf)\times 100/Ci$ (%)
Inhibition coefficient $(Rj)=(Ci-Cf)/Ci$ Where Ci stands for the solute concentration (mg/dl) on the inlet side and Cf for the solute concentration (mg/dl) on the filtrate side.

TABLE 2

| Sample | Creatinine (Mw* 113) (%) | Vitamin B$_{12}$ (Mw 1,350) (%) | Inulin (Mw 5,200) (%) | Cytochrome C (Mw 12,400) (%) | Albumin (Mw 66,000) (%) |
| --- | --- | --- | --- | --- | --- |
| Example 1 | >99.9 | 93.7 | 46.7 ± 0.8 | 30.2 | 0 |
| Control 1 | >99.9 | 90.2 | 22.3 ± 0.7 | 1.1 | 0 |
| Control 2 | >99.9 | 93.8 | 41.2 ± 1.9 | 17.9 | 0 |
| Control 3 | >99.9 | 90.6 | 28.3 ± 1.6 | 4.4 | 0 |
| Control 4 | >99.9 | 91.7 | 34.5 ± 2.4 | 10.0 | 0 |

*Mw: Molecular weight

TABLE 3

| Sample | Creatinine (%) | Vitamin B$_{12}$ (%) | Inulin (%) | Cytochrome C (%) | Albumin (%) |
| --- | --- | --- | --- | --- | --- |
| Example 1 | <0.1 | 6.3 | 53.3 | 69.8 | 100 |
| Control 1 | <0.1 | 9.8 | 77.3 | 98.9 | 100 |
| Control 2 | <0.1 | 6.2 | 58.8 | 82.1 | 100 |
| Control 3 | <0.1 | 9.4 | 71.7 | 95.6 | 100 |
| Control 4 | <0.1 | 8.3 | 75.5 | 90.0 | 100 |

Figure 8:
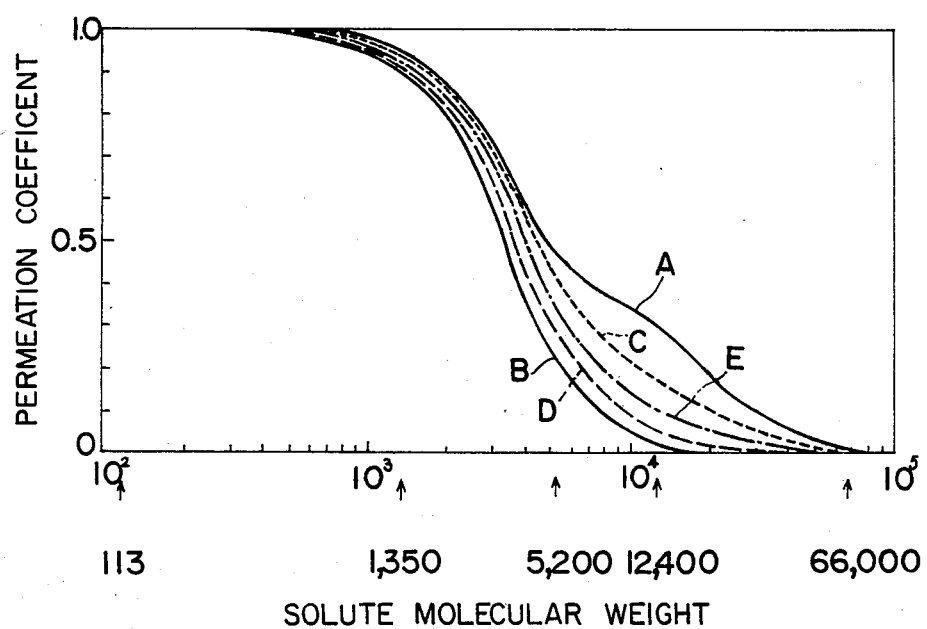
FIG. 8 is a graph showing the realtion between the dialytic coefficient and the molecular weight.

The relation between the permeability coefficient and the molecular weight was as shown in FIG. 8. In the graph of FIG. 8, the curve A represents the data obtained of the hollow fibers of Example 1, the curve B those of the follow fibers of Control 1, the curve C those of the hollow fibers of Control 2, the curve D those of the hollow fibers of Control 3, and the curve E those of the hollow fibers of Control 4 respectively.

The fractional molecular weights for the fixed inhibition ratio 95% with respect to the varying artificial kidney systems as estimated from the data of FIG. 8 were as shown in Table 4.

TABLE 4

| Sample | Fractional molecular weight |
| --- | --- |
| Example 1 | 40,000 |
| Control 1 | 9,600 |
| Control 2 | 30,000 |
| Control 3 | 12,000 |
| Control 4 | 22,000 |

The average volumes of permeation were as shown in Table 5.

TABLE 5

| Sample | Average volume of permeation (ml/min · cm$^2$ · mmHg) |
| --- | --- |
| Example 1 | 6.7 × 10$^{-6}$ |
| Control 1 | 5.5 × 10$^{-6}$ |
| Control 2 | 6.1 × 10$^{-6}$ |
| Control 3 | 3.0 × 10$^{-6}$ |
| Control 4 | 6.2 × 10$^{-6}$ |

The hollow fibers of the present invention showed high permeation ratios of inulin and cytochrome C as compared with the hollow fibers of Controls 1-4 and were found to provide easier permeation of substances of weight-average molcular weights of 5,000 to 20,000. It is thought that about 30%, i.e., 20 to 40% of permeation ratio of cytochrome C is preferable. If the permeation ratio is less than 20%, filtration is not sufficient, and if the permeation ratio is more than 40%, wholly average pore size becomes too large and there is probability to pass albumin.

TABLE 6

| Solute | Molecular weight | Diameter of molecule (Å) |
| --- | --- | --- |
| Creatinine | 13 | 6.4 |
| Vitamin B$_{12}$ | 1,350 | 14.7 |
| Inulin | 5,200 | 23.1 |
| Cytochrome C | 12,400 | 30.8 |
| Albumin | 66,000 | 53.8 |

When the inhibition ratios of the varying solutes were plotted on a normal probability graph by using the values of average moleculars diameter indicated in Table 6, the curves formed of Control 1 and Control 3 showed linearity, suggesting that pores were normally distributed. The average pore diameters were 20 Å and 21 Å respectively. In the hollow fibers of the present invention, pores of 22 to 40 Å were distributed more than those of Control 1 and Control 3 and these pores were not normally distributed.

UFR (Ultra filtration Rate) of examples of present invention and controls was measured in order to make clear the removal efficiency for water thereof. The results was shown in Table 7.

TABLE 7

| Sample | UFR (ml/mm · hr · m$^2$) |
| --- | --- |
| Example 1 | 4.7 |
| Control 1 | 3.5 |
| Control 2 | 3.9 |
| Control 3 | — |
| Control 4 | 3.6 |

The hollow fiber of present invention also showed high removal efficiency for water as compared with one of controls. Besides, the results shown in Table 7 were not necessarily proportionate to the results shown in Table 5, which is due to a variance between the solution with solute flowing inside of the hollow fiber used in measurement of average volume of permeation as shown in Table 5 and the water flowing inside of the hollow fiber used in measurement of UFR as shown in Table 7.

Although only one of UFR of examples of present invention is shown in Table 7, UFR is at least 4.2 in others and the range of more than 4.2 of UFR is sufficient for the removal efficiency for water.

INDUSTRIAL APPLICABILITY

As described above, the present invention relates to a dialytic hollow fiber of cuprammonium cellulose having a continuously perforated hollow core throughout the entire length thereof, which hollow fiber is characterized by having a wall thickness of 5 to 35 μm and a truly circular cross section 50 to 500 μm in outside diameter throughout the entire length and the entire circumference thereof, having a skin layer of not more than 200 Å in the outer surface, and having substantially no voids in the inner surface. Thus, the dialytic hollow fiber has the advantage that the average volume of permeation is large and the maximum fractional molecular weight at 95% of inhibition ratio is large.

Since the hollow fiber of the present invention has tensile strength in the range of 10 to 30 kg/m$^2$, it can tolerate a reduction in the wall thickness. Even from this point, the hollow fiber promises an increase in the effect of permeation. Further, since the hollow fiber of this invention shows elongation of +1.0 to −5.0 under the conditions of 121° C. of temperature and 100% of relative humidity, it can be sterilized safely in an autoclave. Since the hollow fiber of the present invention has a maximum fractional molecular weight of about 40,000 at an inhibition ratio of 95%, it permits permeation of cytochrome C and other substrate having relatively large molecular weights.

Further, the present invention relates to an artificial kidney wherein a bundle of many dialytic hollow fibers of cuprammonium cellulose having a continuously perforated hollow core throughout the entire length thereof, which hollow fiber is characterized by having a wall thickness of 5 to 35 μm and a truly circular cross section 50 to 500 μm in outside diameter throughout the entire length and the entire circumference thereof, having a skin layer of not more than 300 Å in thickness in the outer surface thereof, and containing substantially no voids in the inner surface thereof is inserted into a housing having a blood inlet port and a blood outlet port, and the both ends of the bundle are fixed to the housing by a potting agent. Thus, the artificial kidney has the advantage that the average volume of permeation is large and the maximum fractional molecular weight of inhibition ratio is large, for example, a comparably large molecule such as cytochrome C, etc. can permeate.

We claim:

1. A dialytic hollow fiber of cuprammonium cellulose having a continuously perforated hollow core throughout the entire length thereof, said hollow fiber having a wall thickness of 5 to 35 μm and a truly circular cross section 50 to 500 μm in outside diameter throughout the entire length and the entire circumference thereof, having a skin layer of not more than 300 Å in thickness in the outer surface thereof, and containing substantially no void in the inner surface thereof, having a permeation ratio in the range of 20 to 40% for cytochrome C and in the range of not less than 99.9% for creatinine with an average molcular weight of 12,400, and having a maximum fractional molecular weight of about 40,000 at an inhibition ratio of 95%.

2. The dialytic hollow fiber according to claim 1, wherein the tensile strength of said hollow fiber is in the range of 10 to 30 kg/mm² in dry state.

3. The dialytic hollow fiber according to any one of claims 1 or 2, wherein the elongation of said hollow fiber at 121° C. of temperature and 100% of relative humidity falls in the range of +1.0 to −5.0%.

4. The dialytic hollow fiber according to claim 1, wherein the permeation ratio for Cytochrome C having an average molecular weight of 12,400 is about 30%.

5. Dialytic hollow fiber of cuprammonium cellulose having a continuously perforated hollow core throughout the entire length thereof, said hollow fiber having a wall thickness of 5 to 25 μm and a truly circular cross section 50 to 500 μm in outside diameter throughout the entire length and the entire circumference thereof, having no skin layer in the outer surface thereof, and containing substantially no voids in the inner surface thereof, having an ultra filtration rate (UFR) of over 4.2 (ml/mmHg·hr·m²), having permeation ratios in the range of 20 to 40% for cytochrome C and in the range of not less than 99.9% for creatinine with an average molecular weight of 12,400, and having a maximum fractional molecular weight of about 40,000 at an inhibition ratio of 95%.

6. The dialytic hollow fiber according to claim 5, wherein the tensile strength of said hollow fiber is in the range of 10 to 30 kg/mm² in dry state.

7. The dialytic hollow fiber according to claims 5 or 6, wherein the elongation of said hollow fiber at 121° C. of temperature and 100% of relative humidity falls in the range of +1.0 to −5.0%.

8. An artificial kidney comprising a bundle of many dialytic hollow fibers of cuprammonium cellulose having a continuously perforated hollow core throughout the entire length thereof, said hollow fibers having a wall thickness of 5 to 35 μm and a truly circular cross section 50 to 500 μm in outside diameter throughout the entire length and the entire circumference thereof, having a skin layer of not more than 300 Å in thickness in the outer surface thereof, and containing substantially no voids in the inner surface thereof, and an ultra filtration rate (UFR) of over 4.2 (ml/mmHg·hr·m²), having permeation ratios in the range of 20 to 40% for cytochrome C and in the range of not less than 99.9% for creatinine with an average molecular weight of 12,400, and having a maximum fractional molecular weight of about 40,000 at an inhibition ratio of 95%, said bundle of fibers being inserted into a housing having a blood inlet port and a blood outlet port, and both ends of the bundle are fixed to the housing by a potting agent to communicate with the blood inlet and outlet ports respectively.

9. The artificial kidney according to claim 8 wherein the tensile strength of said hollow fibers is in the range of 10 to 30 kg/mm² in dry state.

10. The artificial kidney according to claim 8 or claim 9, wherein the elongation of said hollow fibers at 121° C. of temperature and 100% of relative humidity falls in the range of +1.0 to −5.0%.

11. The artificial kidney according to claim 10, wherein the elongation of said hollow fiber at 121° C. of temperature and 100% of relative humidity is in the range of 0 to −3.0%.

12. An artificial kidney according to claim 10, wherein the maximum fractional molecular weight of said hollow fiber at an inhibition ratio of 95% is about 40,000.

13. The artificial kidney according to claim 9, wherein said tensile strength is in the range of 15 to 25 kg/mm² in dry state.

14. The artificial kidney according to claim 8, wherein said wall thickness is in the range of 10 to 20 μm, the outside diameter is in the range of 100 to 300 μm, and the thickness of said skin layer in the outer surface is in not more than 200 Å.

15. The artificial kidney according to claim 8, wherein the knot strength falls in the range of 10 to 30 kg/mm² in the dry state.

16. An artificial kidney comprising a bundle of many dialytic hollow fibers of cuprammonium cellulose having a continuously perforated hollow core throughout the entire length thereof, said hollow fiber having a wall thickness of 5 to 35 μm and a truly circular cross section 50 to 500 μm in outside diameter throughout the entire length and the entire circumference thereof, having no skin layer in the outer surface thereof, and containing substantially no voids in the inner surface thereof, and having a permeation ratio in the range of 20 to 40% for cytochrome C and in the range of not less than 99.9% for creatinine with an average molecular weight of 12,400, and having a maximum fractional molecular weight of about 40,000 at an inhibition ratio of 95% said bundle of fibers being inserted into a housing having a blood inlet port and a blood outlet port, and both ends of the bundle are fixed to the housing by a potting agent to communicate with the blood inlet and outlet ports respectively.

17. The artificial kidney according to claim 16, wherein the tensile strength of said hollow fibers is in the range of 10 to 30 kg/mm$^2$ in dry state.

18. The artificial kidney according to claim 16 or 17, wherein the elongation of said hollow fibers at 121° C. of temperature and 100% of relative humidity falls in the range of +1.0 to −5.0%.

19. The artificial kidney according to claim 16, wherein the permeation ration for Cytochrome C having an average molecular weight of 12,400 is about 30%.

20. An artificial kidney comprising a bundle of many dialytic hollow fibers of cuprammonium cellulose having a continuously perforated hollow core throughout the entire length thereof, said hollow fibers having a wall thickness of 5 to 25 μm and a truly circular cross section 50 to 500 μm in outside diameter throughout the entire length and the entire circumference thereof, having no skin layer in the outer surface thereof and containing substantially no voids in the inner surface thereof, having permeation ratios in the range of 20 to 40% for cytochrome C and in the range of not less than 99.9% for creatinine having an ultra filtration rate (UFR) of over 4.2 (ml/mmHg·hr·m$^2$), and having a maximum fractional molecular weight of about 40,000 at an inhibition ratio of 95%, said bundle of fibers being inserted into a housing having a blood inlet port and a blood outlet port, and both ends of the bundle are fixed to the housing by a potting agent to communicate with the blood inlet and outlet ports respectively.

21. The artificial kidney according to claim 20, wherein the tensile strength of said hollow fibers is in the range of 10 to 30 kg/mm$^2$ in dry state.

22. The artificial kidney according to claim 20 or 21, wherein the elongation of said hollow fibers at 121° C. of temperature and 100% of relative humidity falls in the range of +1.0 to −5.0%.

* * * * *

UNITED STATES PATENT AND TRADEMARK OFFICE
CERTIFICATE OF CORRECTION

PATENT NO. : 4,609,464
DATED : September 2, 1986
INVENTOR(S) : AOYAGI et al It is certified that error appears in the above-identified patent and that said Letters Patent is hereby corrected as shown below:

Column 3, line 43, change "holllw" to --hollow--.

Column 3, line 57, change "thicikness" to --thickness--.

Column 5, line 53, change "realtion" to --relation--.

Column 10, line 47, change "advanting" to --advancing--.

Column 13, Table 5, change the numerical designation "$10^{-6}$" to --10-- in each of the five instances.

Signed and Sealed this

Second Day of March, 1993

*Attest:*

STEPHEN G. KUNIN

*Attesting Officer*     *Acting Commissioner of Patents and Trademarks*